(12) United States Patent
Kwak

(10) Patent No.: US 10,826,048 B2
(45) Date of Patent: Nov. 3, 2020

(54) SECONDARY BATTERY

(71) Applicant: Samsung SDI Co., Ltd., Yongin-si, Gyeonggi-do (KR)

(72) Inventor: Seung Ho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 126 days.

(21) Appl. No.: 16/030,542

(22) Filed: Jul. 9, 2018

(65) Prior Publication Data

US 2019/0067664 A1 Feb. 28, 2019

(30) Foreign Application Priority Data

Aug. 31, 2017 (KR) .................. 10-2017-0111142

(51) Int. Cl.
*H01M 2/26* (2006.01)
*H01M 2/04* (2006.01)
*H01M 2/02* (2006.01)

(52) U.S. Cl.
CPC ........... *H01M 2/26* (2013.01); *H01M 2/0257* (2013.01); *H01M 2/0456* (2013.01); *H01M 2/0473* (2013.01); *H01M 2/266* (2013.01)

(58) Field of Classification Search
CPC ............ H01M 2/1061; H01M 2/0473; H01M 2/0217; H01M 2/0257; H01M 2/0456; H01M 2/26; H01M 2/266
See application file for complete search history.

(56) References Cited

U.S. PATENT DOCUMENTS

| 2011/0039152 A1* | 2/2011 | Kim ................... H01M 2/1022 429/178 |
| 2012/0214050 A1* | 8/2012 | Kim ................... H01M 2/263 429/179 |
| 2015/0171384 A1 | 6/2015 | Kim |
| 2016/0099444 A1* | 4/2016 | Park ................... H01M 2/06 429/82 |

FOREIGN PATENT DOCUMENTS

| JP | 2009-87693 A | 4/2009 |
| JP | 5385962 B2 | 1/2014 |
| KR | 10-1724006 B1 | 3/2017 |

* cited by examiner

*Primary Examiner* — Miriam Stagg
*Assistant Examiner* — Lilia Nedialkova
(74) *Attorney, Agent, or Firm* — Lewis Roca Rothgerber Christie LLP

(57) ABSTRACT

A secondary battery includes a retainer and/or an insulation plate having bilateral symmetry, thereby improving work efficiency and productivity. In one or more exemplary embodiments, the secondary battery includes: an electrode assembly; a case receiving the electrode assembly; a cap plate coupled to a top portion of the case and sealing the case; a current collector including a terminal connector positioned between the electrode assembly and the cap plate, and an electrode connector bent from an end of the terminal connector, positioned between the electrode assembly and the case, and having a coupling hole formed therein; an insulation plate positioned on the electrode assembly and coupled to the terminal connector; and a retainer coupled to the electrode connector and including a fixing hook engaged with the coupling hole.

15 Claims, 9 Drawing Sheets

SECONDARY BATTERY

CROSS-REFERENCE TO RELATED APPLICATION

This application claims priority to and the benefit of Korean Patent Application No. 10-2017-0111142, filed on Aug. 31, 2017 in the Korean Intellectual Property Office, the entire content of which is herein incorporated by reference.

BACKGROUND

1. Field

Aspects of embodiments of the present invention relate to a secondary battery.

2. Description of the Related Art

Unlike a primary battery that cannot be charged, a secondary battery may be recharged. A low-capacity secondary battery comprised of one single battery cell may be used as a power source for various portable small-sized electronic devices, such as cellular phones, and camcorders. A high-capacity secondary battery in which several tens of battery cells are connected in a battery pack may be used as a power source for motor drives, such as those in electric vehicles or hybrid electric vehicles.

The secondary battery is manufactured in various shapes, and representative shapes include a cylindrical shape and a prismatic shape. The secondary battery is configured such that an electrode assembly formed by positive and negative electrode plates with a separator as an insulator interposed therebetween, and an electrolyte, are housed in a case, and a cap plate is coupled to the case. In addition, the secondary battery may further include a retainer and/or an insulation plate for electrically insulating the electrode assembly from the case and/or the cap plate.

SUMMARY

According to an aspect of embodiments of the present invention, a secondary battery includes a retainer and/or an insulation plate provided in bilateral symmetry, thereby improving work efficiency and productivity.

According to one or more embodiments of the present invention, a secondary battery includes: an electrode assembly; a case receiving the electrode assembly; a cap plate coupled to a top portion of the case and sealing the case; a current collector including a terminal connector positioned between the electrode assembly and the cap plate, and an electrode connector bent from an end of the terminal connector, positioned between the electrode assembly and the case, and having a coupling hole formed therein; an insulation plate positioned on the electrode assembly and coupled to the terminal connector; and a retainer coupled to the electrode connector and including a fixing hook engaged with the coupling hole.

The fixing hook may include a pair of upper fixing hooks at an upper portion of the retainer, and a pair of lower fixing hooks at a lower portion of the retainer.

The coupling hole may include an upper coupling hole engaged with one of the pair of upper fixing hooks, and a lower coupling hole engaged with one of the pair of lower fixing hooks. The other one of the pair of upper fixing hooks and the other one of the pair of lower fixing hooks may be spaced apart from the electrode connector in a width direction of the retainer.

The retainer may include a main plate coupled to the electrode connector, and a support plate positioned at a lower portion of the main plate and being slanted to support a side surface of the electrode assembly.

The fixing hook may protrude from the main plate.

The electrode connector may be coupled to the retainer so as to be offset to one side on a side surface of the electrode assembly. The retainer may cover the side surface of the electrode assembly.

The retainer may have bilateral symmetry.

The insulation plate may include a center hole at a center of the insulation plate and located to correspond to a safety vent of the cap plate; an inlet hole outside the center hole and located to correspond to an electrolyte injection hole of the cap plate, and a fixing hook outside the inlet hole and upwardly protruding.

The insulation plate may have bilateral symmetry with respect to the center hole.

The terminal connector may have a through hole engaged with the fixing hook of the insulation plate.

The inlet hole may include a pair of inlet holes located at opposite sides of the center hole. The fixing hook may include a pair of fixing hooks located at opposite sides of the pair of inlet holes.

The electrode connector may include: a first region extending downwardly from the end of the terminal connector; and a second region extending downwardly from the first region and protruding toward the electrode assembly, and the coupling hole may be formed in the first region. A protrusion height of the fixing hook may be not greater than a step difference between the first region and the second region.

As described above, in the secondary battery according to an aspect of one or more embodiments of the present invention, since the retainer having a fixing hook is formed to have bilateral symmetry, it can be coupled to the current collecting portion, irrespective of the slanted direction and polarity of the electrode connector, thereby improving work efficiency and productivity.

In addition, since the secondary battery according to one or more embodiments of the present invention includes an insulation plate formed to have bilateral symmetry, the work efficiency and productivity can be improved.

DETAILED DESCRIPTION

Herein, an exemplary embodiment of the present invention will be described in further detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. In addition, as used herein, the term "and/or" includes any and all combinations of one or more of the associated listed items.

In addition, spatially relative terms, such as "below," "beneath," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1:
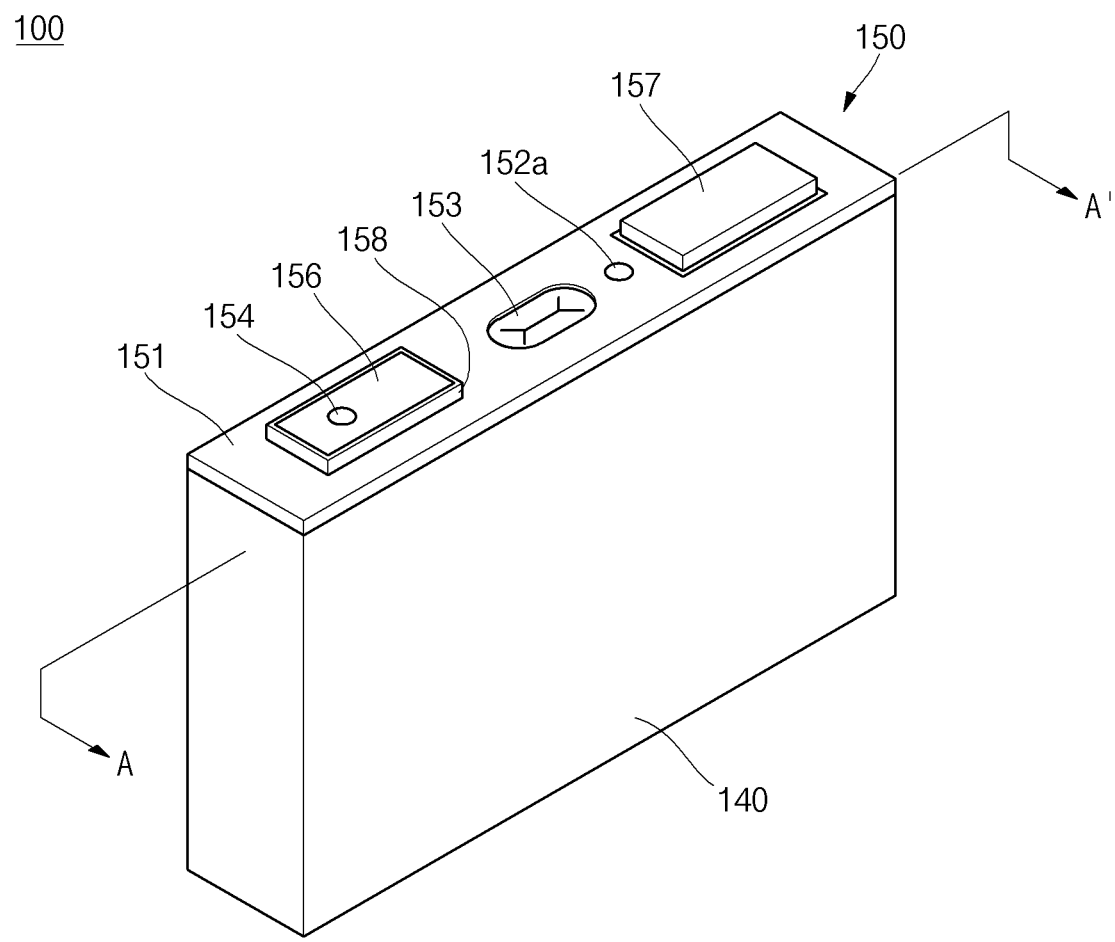
FIG. 1 is a perspective view of a secondary battery according to an embodiment of the present invention.
Figure 2:
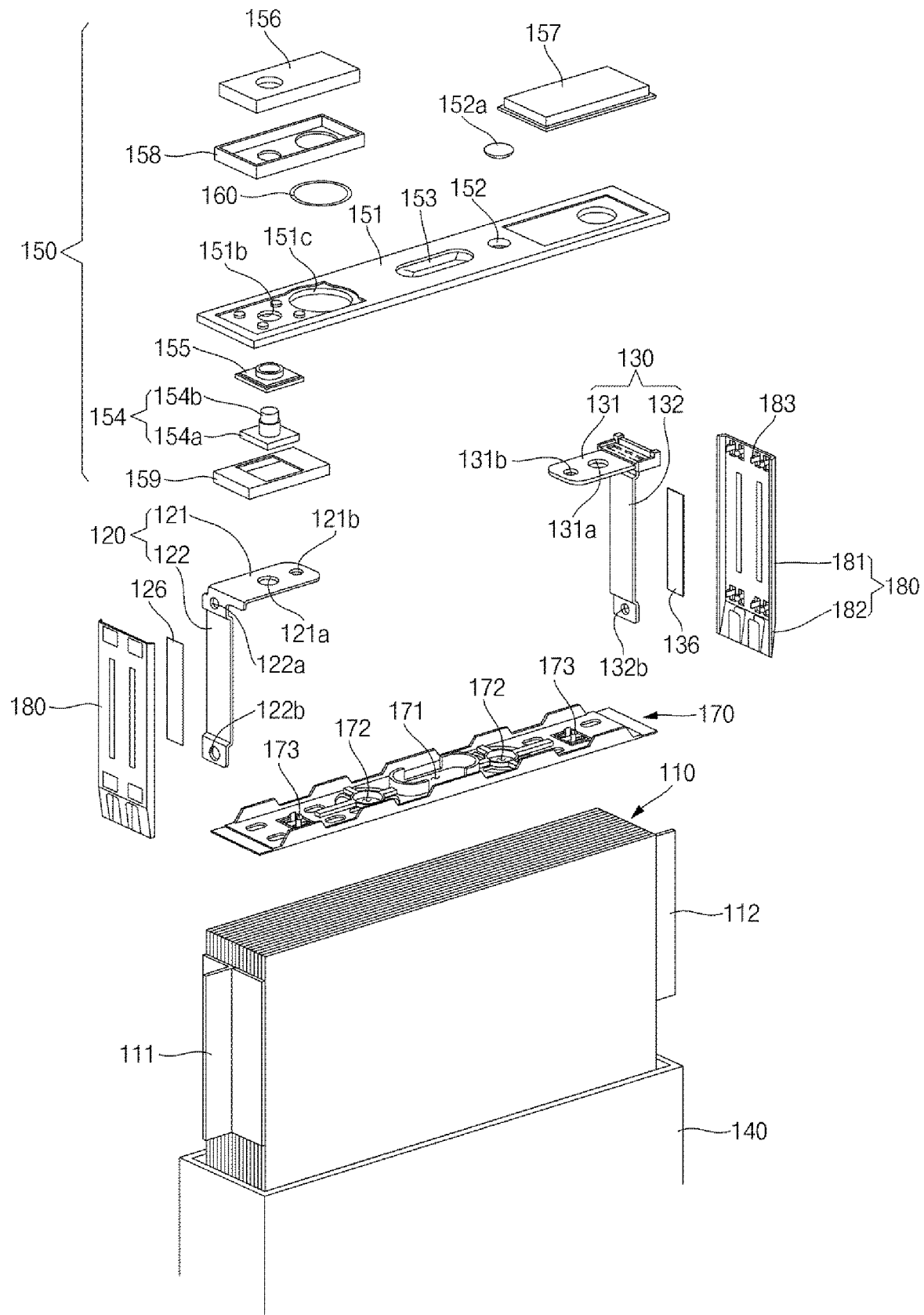
FIG. 2 is an exploded perspective view of a secondary battery according to an embodiment of the present invention.
Figure 3:
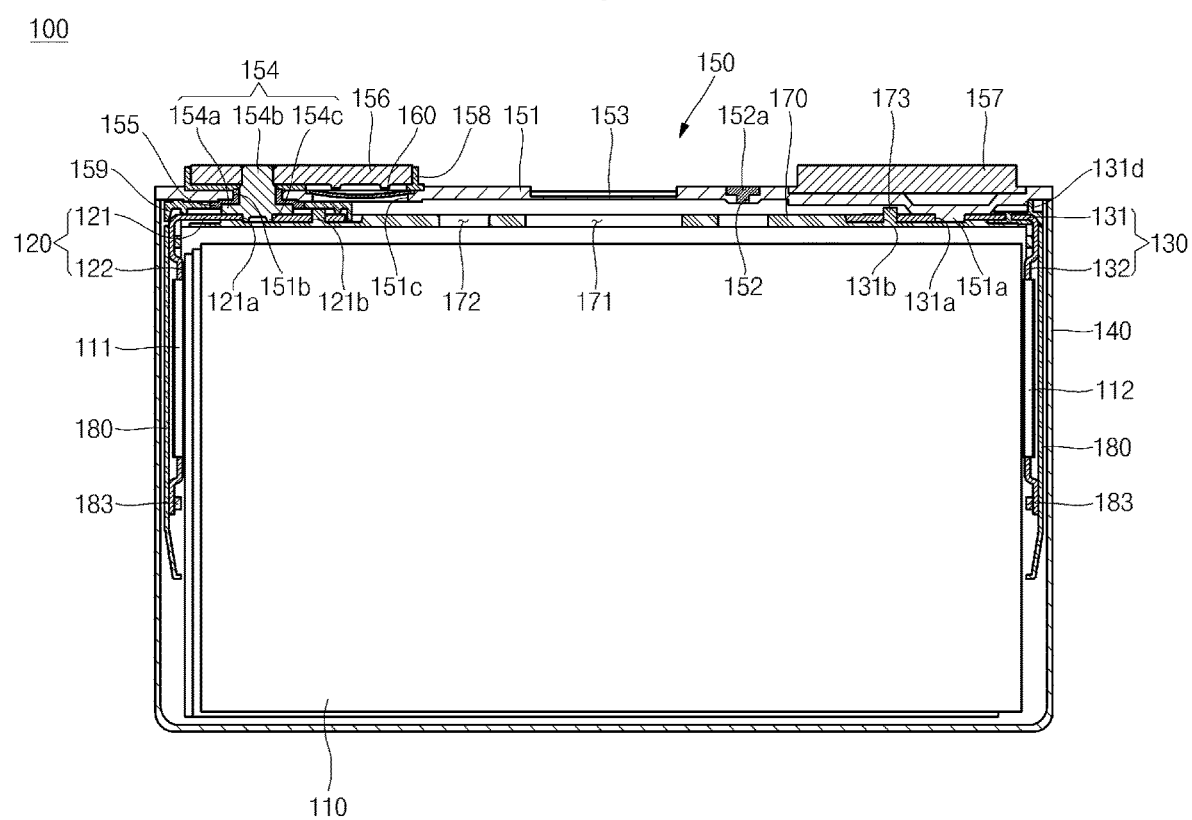
FIG. 3 is a cross-sectional view taken along the line A-A' of FIG. 1.
Figure 4A:
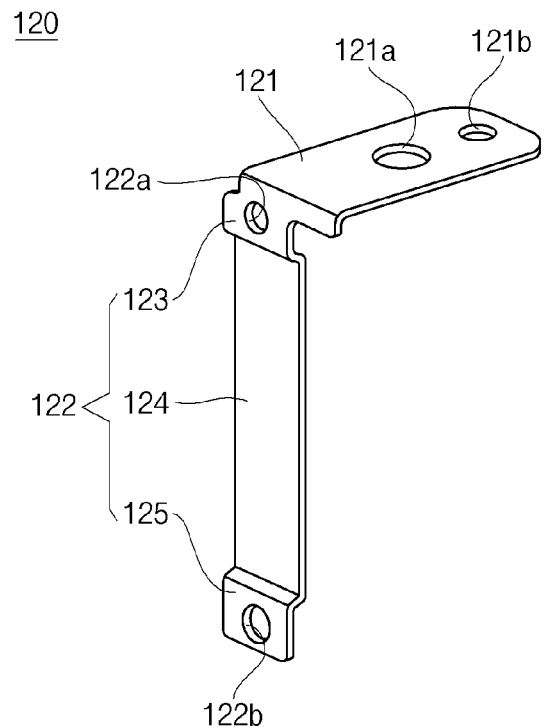
FIG. 4A is a perspective view illustrating a first current collecting portion.
Figure 4B:
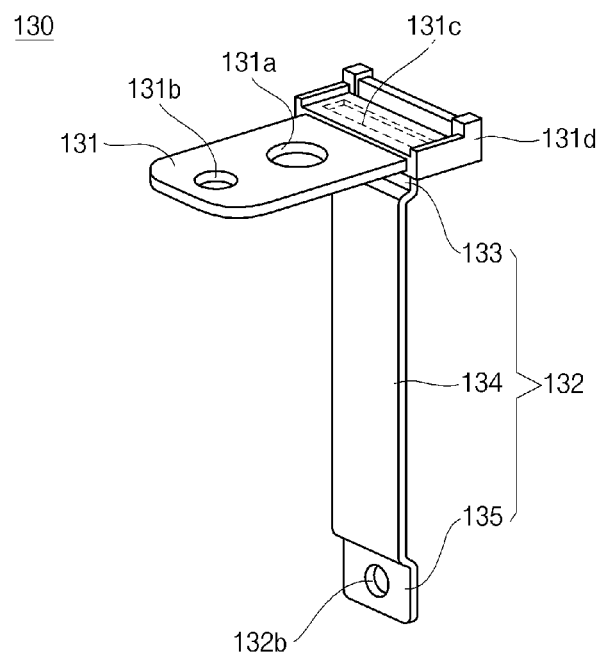
FIG. 4B is a perspective view illustrating a second current collecting portion.
Figure 5:
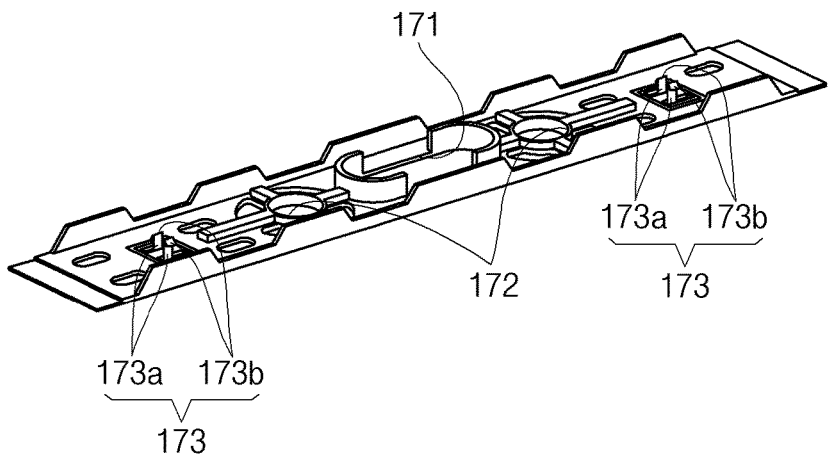
FIG. 5 is a perspective view illustrating an insulation plate.
Figure 6:
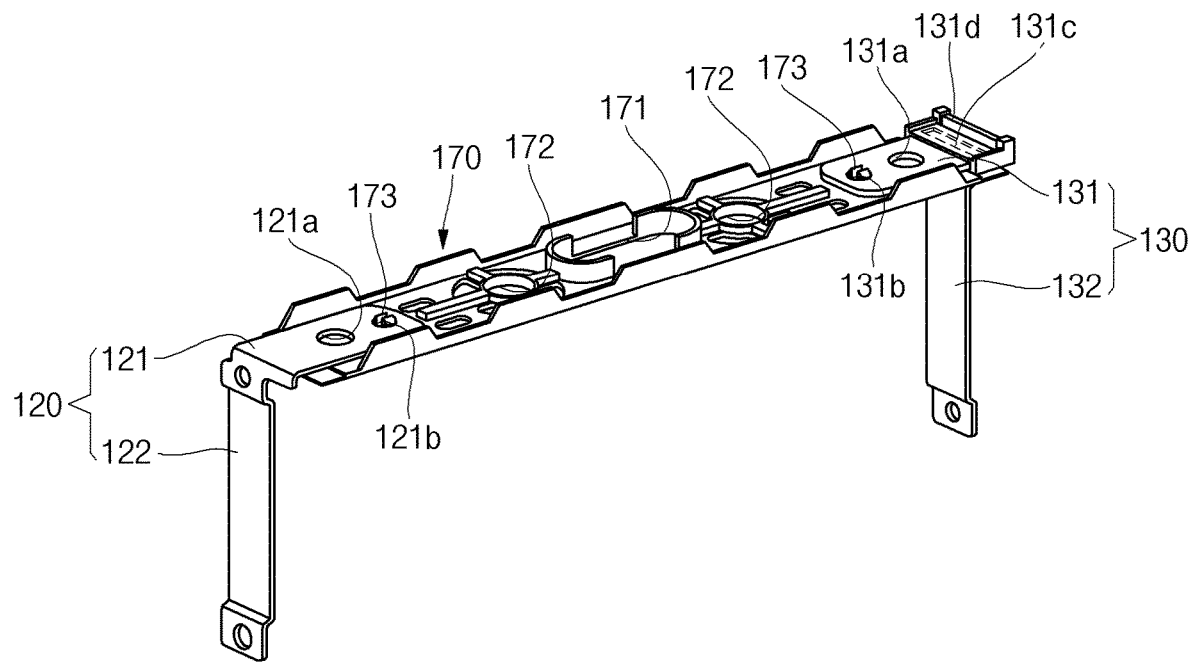
FIG. 6 is a perspective view illustrating a state in which a current collecting portion is coupled to an insulation plate.
Figure 7:
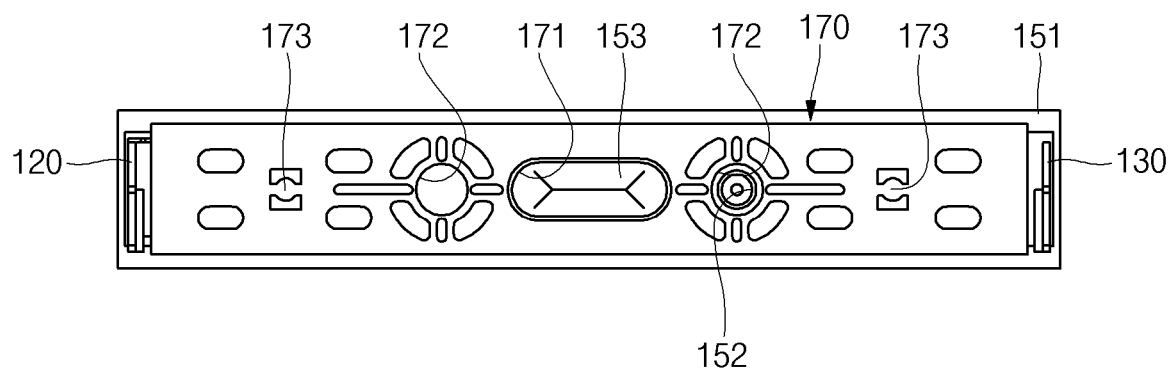
FIG. 7 is a bottom view illustrating a state in which an insulation plate and a current collecting portion are coupled to a cap plate.
Figure 8:
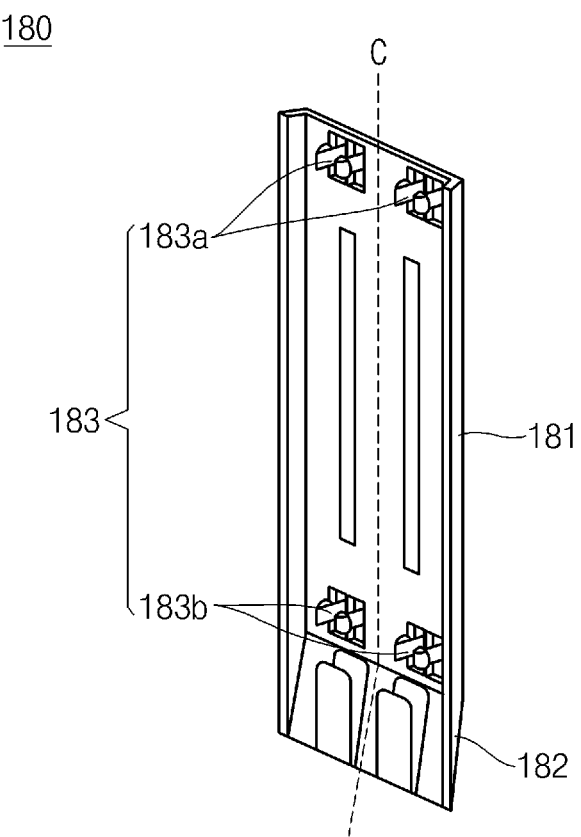
FIG. 8 is a perspective view illustrating a retainer.
Figure 9:
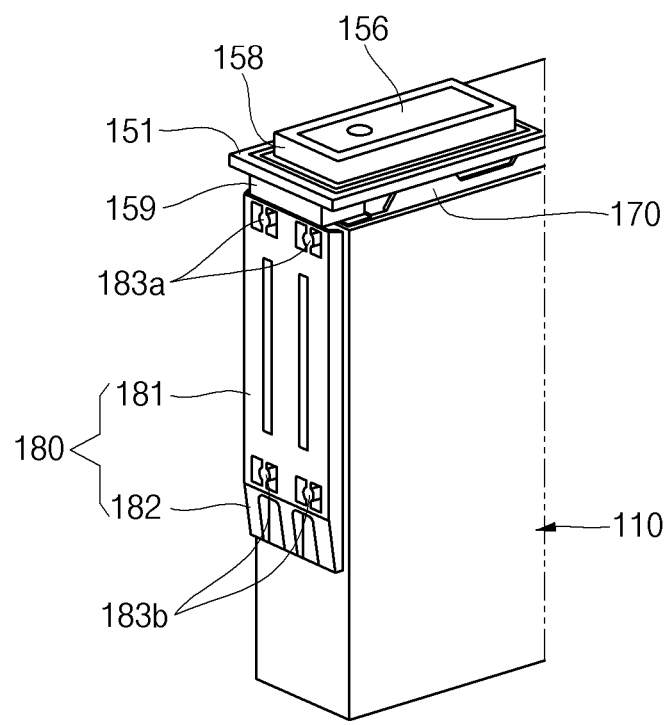
FIG. 9 is a perspective view illustrating a state in which a retainer is coupled to a current collecting portion.
Figure 10:
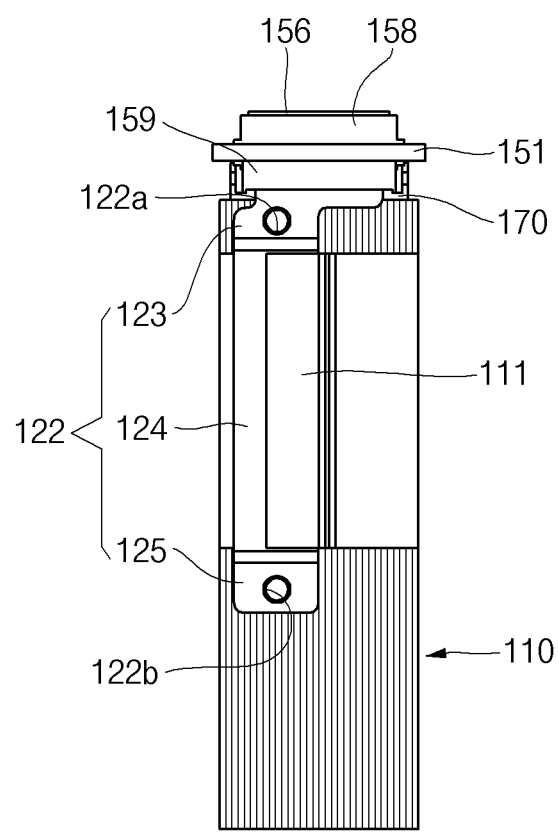
FIG. 10 is a side view illustrating a state in which a current collecting portion is coupled to an electrode assembly.
Figure 11:
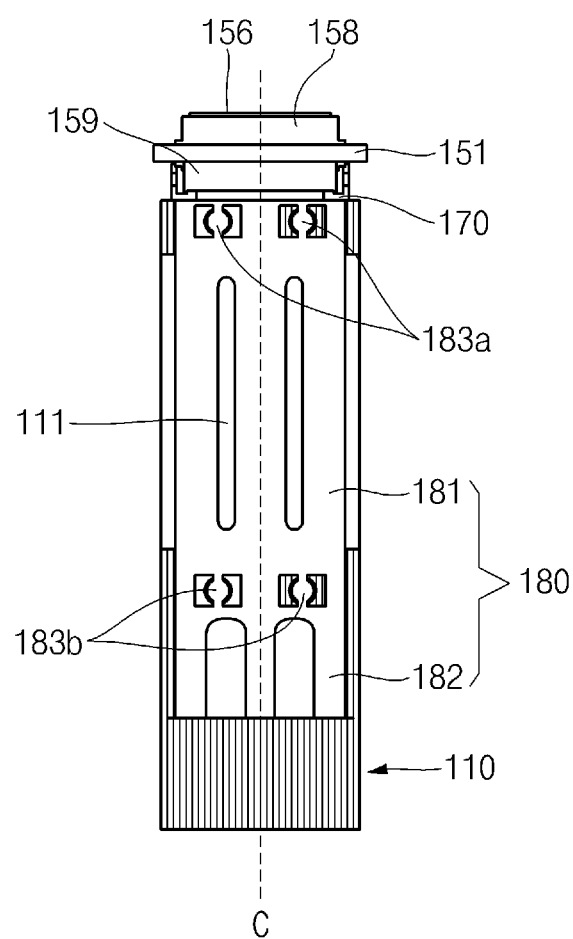
FIG. 11 is a side view illustrating a state in which a retainer is coupled to a current collecting portion.

FIG. 1 is a perspective view of a secondary battery according to an embodiment of the present invention. FIG. 2 is an exploded perspective view of a secondary battery according to an embodiment of the present invention. FIG. 3 is a cross-sectional view taken along the line A-A' of FIG. 1. FIG. 4A is a perspective view illustrating a first current collecting portion; and FIG. 4B is a perspective view illustrating a second current collecting portion. FIG. 5 is a perspective view illustrating an insulation plate. FIG. 6 is a perspective view illustrating a state in which a current collecting portion is coupled to an insulation plate. FIG. 7 is a bottom view illustrating a state in which an insulation plate and a current collecting portion are coupled to a cap plate. FIG. 8 is a perspective view illustrating a retainer. FIG. 9 is a perspective view illustrating a state in which a retainer is coupled to a current collecting portion. FIG. 10 is a side view illustrating a state in which a current collecting portion is coupled to an electrode assembly. FIG. 11 is a side view illustrating a state in which a retainer is coupled to a current collecting portion.

Referring to FIGS. 1 to 3, a secondary battery 100 according to an embodiment of the present invention includes an electrode assembly 110, current collecting portions or current collectors 120 and 130, a case 140, a cap assembly 150, an insulation plate 170, and a retainer 180.

In an embodiment, the electrode assembly 110 is formed by a plurality of stacks each including a first electrode plate, a separator, and a second electrode plate, which are thin plates or layers. Here, the first electrode plate may operate as a negative electrode and the second electrode plate may operate as a positive electrode. Of course, polarities of the first electrode plate and the second electrode plate may be optionally changed by one skilled in the art.

In an embodiment, the first electrode plate is formed by coating a first electrode active material, such as graphite or carbon, on a first electrode current collector formed of a metal foil made of copper, a copper alloy, nickel, or a nickel alloy, and includes a first electrode uncoated portion 111 where the first electrode active material is not applied. The first electrode uncoated portion 111 provides a path of a flow of current between the first electrode plate and the outside.

In addition, the first electrode uncoated portion 111 is formed to be overlapped at a same position when the first electrode plates of the plurality of stacks are stacked, thereby forming a multi-tab structure. The first electrode uncoated portion 111 is formed to protrude to one side of the electrode assembly 110. A plurality of first electrode uncoated portions 111 may be welded to one another, thereby forming a first current collecting tab. In an embodiment, the first current collecting tab is integrally formed with the first electrode plate and is drawn from each of the first electrode plates of the stacks, such that current collecting efficiency of the electrode assembly 110 can be advantageously increased. However, the first current collecting tab may also be formed by a separate member optionally provided by one skilled in the art.

In an embodiment, the second electrode plate is formed by coating a second electrode active material, such as a transition metal oxide, on a second electrode current collector formed of a metal foil made of aluminum or an aluminum alloy, and includes a second electrode uncoated portion 112 where the second electrode active material is not applied.

In addition, the second electrode uncoated portion is formed to be overlapped at a same position when the second electrode plates of the plurality of stacks are stacked, forming a multi-tab structure. The second electrode uncoated portion 112 is formed to protrude to the other side of the electrode assembly 110. A plurality of second electrode uncoated portions 112 may be welded to one another, thereby forming a second current collecting tab.

The separator disposed between the first electrode plate and the second electrode plate may prevent or substantially prevent an electrical short circuit therebetween and allow the movement of lithium ions. In an embodiment, the separator may include polyethylene, polypropylene, or a composite film of polyethylene and polypropylene. However, according to the present invention, the material of the separator is not limited to those listed above.

The electrode assembly 110 may be received in the case 140 along with, for example, an electrolyte. The electrolyte may include a lithium salt, such as $LiPF_6$ or $LiBF_4$, dissolved in an organic solvent, such as EC (ethylene carbonate), PC (propylene carbonate), DEC (diethyl carbonate), EMC (ethyl methyl carbonate), or DMC (dimethyl carbonate). In addition, the electrolyte may be in a liquid phase, a solid phase, or a gel phase.

The current collecting portions 120 and 130 include a first current collecting portion 120 electrically connected to the first electrode plate and a second current collecting portion 130 electrically connected to the second electrode plate.

The first current collecting portion 120 is made of a conductive material, such as nickel, and makes contact with the first electrode uncoated portion 111 protruding to one end of the electrode assembly 110 to then be electrically connected to the first electrode plate. The first current collecting portion 120 includes a first terminal connector 121 and a first electrode connector 122.

The first terminal connector 121 is positioned on the electrode assembly 110 and is formed to be parallel with a cap plate 151, which will later be described. That is, the first terminal connector 121 is positioned between the electrode assembly 110 and the cap plate 151 and is shaped of a substantially planar plate. The first terminal connector 121 includes a terminal hole 121a engaged with an electrode terminal 154 and a through hole 121b engaged with the insulation plate 170. In an embodiment, the terminal hole 121a, compared to the through hole 121b, is formed adjacent to the first electrode connector 122.

The first electrode connector 122 is bent at an end of the first terminal connector 121 to downwardly extend and is formed at one side of the electrode assembly 110. The first electrode uncoated portion 111 is connected to the first electrode connector 122.

Referring to FIG. 4A, in an embodiment, the first electrode connector 122 includes a first region 123 bent at an end of the first terminal connector 121 to downwardly extend from the first terminal connector 121, a second region 124 downwardly extending from the first region 123 and protruding toward the electrode assembly 110, and a third region 125 downwardly extending from the second region 124 and protruding away from the electrode assembly 110 (in a direction facing the case 140). In an embodiment, the first region 123 and the third region 125 are positioned on a same line. That is, the first electrode connector 122 is configured such that it protrudes toward the electrode assembly 110 at its central portion (i.e. the second region 124). In other words, the first region 123 and the third region 125 are formed to protrude toward the case 140, while the second region 124 is formed to protrude toward the electrode assembly 110. Therefore, the second region 124 is formed in a stepwise manner with respect to the first region 123 and the third region 125. The first electrode uncoated portion 111 is electrically connected to the second region 124. Therefore, a length of the second region 124 may be equal to or greater than that of the first electrode uncoated portion 111. In an embodiment, the first electrode uncoated portion 111 is connected to a surface of the second region 124 facing the case 140, and a protrusion thickness of the second region 124 is equal to or greater than thicknesses of the plurality of first electrode uncoated portions 111. Therefore, in an embodiment, when the first electrode uncoated portion 111 is welded to the second region 124, the first electrode uncoated portion 111 may not protrude to the outside of the first current collecting portion 120. In an embodiment, the first electrode uncoated portion 111 may be welded to the second region 124 through an auxiliary tab 126, and the auxiliary tab 126 may be formed to have a smaller thickness than the second region 124.

The retainer 180, which will later be described, is coupled to the first region 123 and the third region 125. An upper coupling hole 122a is formed in the first region 123, and a lower coupling hole 122b is formed in the third region 125.

The second current collecting portion 130 is made of a conductive material, such as aluminum, and makes contact with the second electrode uncoated portion 112 protruding to the other end of the electrode assembly 110 to be electrically connected to the second electrode plate. The second current collecting portion 130 includes a second terminal connector 131 and a second electrode connector 132.

The second terminal connector 131 is positioned on the electrode assembly 110 and is formed to be parallel with the cap plate 151, which will later be described. That is, the second terminal connector 131 is positioned between the electrode assembly 110 and the cap plate 151 and is shaped of a substantially planar plate.

Referring to FIG. 4B, the second terminal connector 131 includes a terminal hole 131a engaged with an electrode terminal or a terminal protrusion part 151a and a through hole 131b engaged with the insulation plate 170. In an embodiment, a fuse hole 131c may further be formed in the second terminal connector 131. In an embodiment, the fuse hole 131c is formed in a region adjacent to the second electrode connector 132 in the second terminal connector 131. The fuse hole 131c may be formed to have a rectangular shape, for example, an elongated rectangle perpendicular to a lengthwise direction of the second terminal connector 131, but embodiments of the present invention are not limited to the shape disclosed herein. The fuse hole 131c is configured such that it may reduce a cross-sectional area of the second terminal connector 131. When a large amount of current flows through the secondary battery 100 due to occurrence of a short circuit, heat may be generated. A region where the fuse hole 131c is formed may be melted by the generated heat to then be ruptured, thereby cutting off the flow of current. In an embodiment, a molding member 131d is formed at an end of the second terminal connector 131. The molding member 131d covers the fuse hole 131c. In an embodiment, the molding member 131d is formed in the second terminal connector 131 by insert-molding. The molding member 131d functions to prevent or substantially prevent an arc from occurring when the region where the fuse hole 131c is formed is melted and then ruptured. The molding member 131d may be generally made of an insulating material, such as polypropylene or polyethylene, but embodiments of the present invention are not limited to the material disclosed herein.

The second electrode connector 132 is bent at an end of the second terminal connector 131 to downwardly extend and is formed at the other side of the electrode assembly 110. The second electrode uncoated portion 112 is connected to the second electrode connector 132. In an embodiment, the second electrode connector 132 includes a first region 133 bent at an end of the second terminal connector 131 to downwardly extend from the second terminal connector 131, a second region 134 downwardly extending from the first region 133 and protruding toward the electrode assembly 110, and a third region 135 downwardly extending from the second region 134 and protruding away from the electrode assembly 110 (in a direction facing the case 140). In an embodiment, the second electrode connector 132 has substantially a same shape as that of the first electrode connector 122. Thus, the following description will focus on differences between the first electrode connector 122 and the second electrode connector 132.

The second electrode uncoated portion 112 is electrically connected to the second region 134. Additionally, the second electrode uncoated portion 112 is connected to a surface facing the case 140 in the second region 134. In an embodiment, the second electrode uncoated portion 112 may be welded to the second region 134 through an auxiliary tab 136, and the auxiliary tab 136 may be formed to have a smaller thickness than the second region 134.

The retainer 180, which will later be described, is coupled to the first region 133 and the third region 135. An upper coupling hole (not shown) is formed in the first region 133, and a lower coupling hole 132b is formed in the third region 135.

In an embodiment, the case 140 is made of a conductive metal, such as aluminum, an aluminum alloy, or nickel plated steel, and is substantially shaped as a hexahedron having an opening through which the electrode assembly 110 can be inserted and placed. The cap plate 151 is coupled to the opening of the case 140 to seal the case 140. In an embodiment, the internal surface of the case 140 is subjected to insulation treatment, thereby preventing or substantially preventing an electrical short circuit from being generated in the case 140. In an embodiment, one electrode of the electrode assembly 110 may be electrically connected to the case 140 through the cap plate 151. In this case, it is possible to prevent or substantially prevent an electrical short circuit from being generated in the case 140 due to the insulation treatment of the internal surface of the case 140. For example, the case 140 may operate as a positive electrode.

The cap assembly 150 is coupled to a top portion or opening of the case 140. In an embodiment, the cap assembly 150 includes the cap plate 151, an electrolyte injection hole 152, a safety vent 153, the electrode terminal 154, a gasket 155, a first terminal plate 156, a second terminal plate 157, an upper insulation member 158, a lower insulation member 159, and a short-circuit plate 160.

The cap plate 151 is shaped as a plate to seal the opening of the case 140 and may be made of a same material as the case 140. In an embodiment, the cap plate 151 may be coupled to the case 140 by laser welding. In an embodiment, the cap plate 151 may be electrically independent. In an embodiment, the cap plate 151 may be electrically connected to one of the first current collecting portion 120 or the second current collecting portion 130. For example, the cap plate 151 may be electrically connected to the second current collecting portion 130. In this case, the cap plate 151 and the case 140 may have the same polarity (e.g., a positive polarity).

The electrolyte injection hole 152 for injection of an electrolyte is formed in the cap plate 151. The electrolyte is injected into the case 140 through the electrolyte injection hole 152. Thereafter, the electrolyte injection hole 152 is sealed by a plug 152a. In an embodiment, the terminal protrusion part 151a protruding downwardly (i.e. toward the electrode assembly 110) is formed at one side of the cap plate 151. The terminal protrusion part 151a is coupled to the terminal hole 131a of the second current collecting portion 130. Therefore, the cap plate 151 is electrically connected to the second current collecting portion 130. Of course, a separate electrode terminal may pass through the cap plate 151 to then be coupled to the cap plate 151, and the electrode terminal may also be coupled to the terminal hole 131a of the second current collecting portion 130.

In an embodiment, the safety vent 153 having a smaller thickness than other regions is formed at a central portion (i.e. a central portion or approximately central portion) of the cap plate 151. When the internal pressure of the case 140 exceeds a preset rupture pressure, the safety vent 153 may be ruptured, thereby preventing or substantially preventing the secondary battery 100 from exploding.

An electrode terminal hole 151b through which the electrode terminal 154 passes is formed at one side of the cap plate 151. The electrode terminal 154 is formed opposite to the terminal protrusion part 151a formed in the cap plate 151. The electrode terminal 154 is coupled to the first current collecting portion 120 to be electrically connected to the first electrode plate. The electrode terminal 154 includes a body part 154a and a terminal part 154b vertically protruding from the body part 154a. The terminal part 154b is coupled to the electrode terminal hole 151b of the cap plate 151 and has a top portion riveted to be fixed to the cap plate 151. The body part 154a is formed under the terminal part 154b and has a larger area than the terminal part 154b. In addition, a protrusion 154c is formed on a bottom surface of the body part 154a to be engaged with the first terminal connector 121. The protrusion 154c is engaged with the terminal hole 121a of the first terminal connector 121 to electrically connect the electrode terminal 154 to the first current collecting portion 120.

The gasket 155 is formed in the electrode terminal hole 151b. The gasket 155 is made of an insulating material and is coupled to the electrode terminal hole 151b under the cap plate 151 to seal a gap between the electrode terminal 154 and the cap plate 151. The gasket 155 may prevent or substantially prevent external moisture from penetrating into the secondary battery 100 and may prevent or substantially prevent the electrolyte received in the secondary battery 100 from flowing out.

The first terminal plate 156 is coupled to the electrode terminal 154 upwardly protruding from the cap plate 151 through the electrode terminal hole 151b of the cap plate 151. In an embodiment, after the first terminal plate 156 is coupled to the electrode terminal 154, a top portion of the electrode terminal 154 is riveted or welded, thereby fixing the electrode terminal 154 to the first terminal plate 156.

The second terminal plate 157 is coupled to a top portion of the cap plate 151 having the terminal protrusion part 151a formed therein. The second terminal plate 157 is coupled to the cap plate 151 by, for example, welding or forced fitting, to then be electrically connected to the cap plate 151.

The upper insulation member 158 is positioned between the first terminal plate 156 and the cap plate 151 and electrically insulates the electrode terminal 154 from the cap plate 151. The upper insulation member 158 makes close contact with the cap plate 151 and the gasket 155 through the first terminal plate 156.

The lower insulation member 159 is positioned between the first current collecting portion 120 and the cap plate 151 and electrically insulates the first current collecting portion 120 from the cap plate 151. In an embodiment, the lower insulation member 159 is formed in such a manner that it surrounds the first terminal connector 121 of the first current collecting portion 120. A hole is formed in the lower insulation member 159 to allow the electrode terminal 154 to be coupled to the first terminal connector 121.

The short-circuit plate 160 is formed in a short-circuit hole 151c formed at one side of the cap plate 151. Here, the short-circuit hole 151c is formed in a vicinity of the electrode terminal hole 151b engaged with the electrode terminal 154. The short-circuit plate 160 is positioned between the upper insulation member 158 and the cap plate 151 in the short-circuit hole 151c. Here, a hole corresponding to the short-circuit hole 151c is also formed in the upper insulation member 158. In an embodiment, the short-circuit plate 160 is formed as an inversion plate including a downwardly convex round portion and a rim portion fixed to the cap plate 151. The short-circuit plate 160 has a same polarity as the cap plate 151. When the internal pressure of the case 140 exceeds a preset reference pressure, the short-circuit plate 160 is inverted (that is, upwardly convexly protrudes) to make contact with the first terminal plate 156 coupled to the electrode terminal 154, thereby causing a short circuit.

The insulation plate 170 is positioned between the cap plate 151 and the electrode assembly 110. In further detail, the insulation plate 170 is positioned between the electrode assembly 110 and each of the first and second terminal connectors 121 and 131. The insulation plate 170 protects the electrode assembly 110. In particular, when the cap plate 151 is internally deformed, the insulation plate 170 may prevent or substantially prevent the electrode assembly 110 from being damaged. The insulation plate 170 may be made of a general insulating material, such as polypropylene or polyethylene, but embodiments of the present invention are not limited to the materials disclosed herein.

Referring to FIGS. 5 to 7, the insulation plate 170 includes a center hole 171, an inlet hole 172, and a fixing hook 173.

The center hole 171 is formed at a center of the insulation plate 170 and is located to correspond to the safety vent 153. Therefore, when internal gases generated in the secondary battery 100 reach the safety vent 153 through the center hole 171, the safety vent 153 may be ruptured at a preset rupture pressure, thereby releasing the internal gases.

The inlet hole 172 is formed at an exterior side of the center hole 171 and is located to correspond to the electrolyte injection hole 152. Therefore, the electrolyte injected through the electrolyte injection hole 152 may flow into the electrode assembly 110 through the inlet hole 172. The inlet hole 172 is provided at opposite sides of the center hole 171 as a pair of inlet holes, which may be symmetrically formed with respect to the center hole 171.

The fixing hook 173 is formed at an exterior side of the inlet hole 172 and upwardly protrudes from the insulation plate 170. The fixing hook 173 is provided at opposite sides of the inlet hole 172 as a pair of fixing hooks, which may be symmetrically formed with respect to the center hole 171. The fixing hooks 173 are engaged with the through holes 121b and 131b of the first and second current collecting portions 120 and 130. As illustrated in FIG. 6, once the fixing hooks 173 are engaged with the through holes 121b and 131b, they may be tightly fixed without being dislodged from the through holes 121b and 131b. For example, the fixing hooks 173 may include two support portions 173a, and stoppers 173b may be formed at ends of the support portions 173a. The support portions 173a may pass through the through holes 121b and 131b, and the stoppers 173b may then protrude to upper portions of the through holes 121b and 131b. Therefore, the fixing hooks 173 may be fixed to the through holes 121b and 131b without being dislodged therefrom. The fixing hooks 173 as described are provided by way of example, but embodiments of the present invention are not limited to the configuration disclosed herein. In other words, the fixing hooks 173 may have any configuration so long as they can be coupled and fixed to the through holes 121b and 131b.

In this way, the insulation plate 170 has the inlet hole 172 and the fixing hook 173 formed to be symmetrical to each other in view of the center hole 171. Therefore, irrespective of the direction, the insulation plate 170 can be coupled to the current collecting portions 120 and 130 to then be inserted into the case 140. That is, since the insulation plate 170 can be coupled to the current collecting portions 120 and 130, irrespective of the direction in which the insulation plate 170 is inserted into the case 140, the electrolyte being injected into the electrode assembly 110 is not influenced by the orientation in which the insulation plate 170 is inserted.

The retainers 180 are installed between the first current collecting portion 120 and the case 140 and between the second current collecting portion 130 and the case 140. The retainers 180 are coupled to the first electrode connector 122 of the first current collecting portion 120 and the second electrode connector 132 of the second current collecting portion 130, respectively. In an embodiment, the retainers 180 are formed to have larger widths than the first and second electrode connectors 122 and 132 and surround opposite side surfaces of the electrode assembly 110. Therefore, the retainers 180 are coupled to the current collecting portions 120 and 130 to electrically insulate the electrode assembly 110 from the case 140. For brevity and clarity, the following description will focus on the retainer 180 coupled to the first current collecting portion 120.

Referring to FIGS. 8 and 9, in an embodiment, the retainer 180 includes a main plate 181 shaped as a planar plate, and a support plate 182 positioned at a lower portion of the main plate 181 and formed to be slanted. In an embodiment, the main plate 181 is directly coupled to the first current collecting portion 120 and has a width equal to that of the side surface (a stacking thickness) of the electrode assembly 110. Therefore, the main plate 181 is coupled to the first current collecting portion 120 while covering the side surface of the electrode assembly 110. The support plate 182 is positioned at the lower portion of the main plate 181 and functions to support the side surface of the electrode assembly 110. In further detail, the support plate 182 supports a non-protruded portion of the electrode assembly 110 where the first electrode uncoated portion 111 is not protruded. A protruded portion of the electrode assembly 110, where the first electrode uncoated portion 111 is protruded, is coupled to the first current collecting portion 120. Therefore, in an embodiment, since the support plate 182 is slanted as much as the thickness of the first electrode uncoated portion 111 coupled to the first current collecting portion 120, the support plate 182 supports the non-protruded portion of the electrode assembly 110.

A fixing hook 183 coupled to the first current collecting portion 120 is formed in the main plate 181. In an embodiment, the fixing hook 183 may be formed to have the same configuration with the fixing hook 173 formed in the insulation plate 170, but embodiments of the present invention are not limited to the configuration of the fixing hook 183 disclosed herein. The fixing hook 183 includes an upper fixing hook 183a and a lower fixing hook 183b. The upper fixing hook 183a is engaged with the upper coupling hole 122a of the first current collecting portion 120, and the lower fixing hook 183b is engaged with the lower coupling hole 122b of the first current collecting portion 120.

Since the first and third regions 123 and 125, compared to the second region 124, of the first electrode connector 122 are protruded to the outside of the electrode assembly 110, the fixing hook 183 is not brought into contact with the electrode assembly 110 even if the fixing hook 183 is coupled to the upper and lower coupling holes 122a and 122b. Here, a protrusion height of the fixing hook 183 is not greater than a step difference formed between each of the first and third regions 123 and 125 and the second region 124. Accordingly, even when external shocks or vibrations are applied to the secondary battery 100, the fixing hook 183 can prevent or substantially prevent the electrode assembly 110 from being damaged. The retainer 180 may be made of an insulating material, such as polypropylene or polyethylene, but embodiments of the present invention are not limited to the materials disclosed herein.

In an embodiment, each of the upper fixing hook 183a and the lower fixing hook 183b is provided as a pair. That is, a pair of upper fixing hooks 183a is formed at an upper portion of the main plate 181, and a pair of lower fixing hooks 183b is formed at a lower portion of the main plate 181. In an embodiment, the upper fixing hooks 183a are formed to be symmetrical to each other in view of a centerline "C" of the main plate 181. That is, the retainers 180 are formed to have bilateral symmetry, that is, to be symmetrical in a transverse direction.

Additionally, only one of the pair of upper fixing hooks 183a is engaged with the upper coupling hole 122a, and only one of the pair of lower fixing hooks 183b is engaged with the lower coupling hole 122b.

Referring to FIG. 10, the first electrode uncoated portion 111 includes a plurality of first electrode uncoated portions welded to one another at a central portion (i.e. a central portion or an approximately central portion) of the stacking direction of the electrode assembly 110, forming a first current collecting tab. In addition, the first electrode connector 122 of the first current collecting portion 120 is bent from an end of the first terminal connector 121 and extends therefrom. The first electrode connector 122 is formed to be slanted or offset to one side in the stacking direction of the electrode assembly 110. That is, the first electrode connector 122 is formed only at one side of the electrode assembly 110 (at the left or right side on the drawing), in view of the central portion of the stacked electrode assembly 110. Therefore, the plurality of first electrode uncoated portions 111 welded to one another may be bent at the central portion along the stacking direction of the electrode assembly 110, thereby facilitating welding the welded first electrode uncoated portions 111 to the first electrode connector 122 and minimizing or reducing lengths of the first electrode uncoated portions 111. In an embodiment, as illustrated in FIG. 11, the retainer 180 is formed to cover (e.g., entirely cover) the side surface of the electrode assembly 110. Here, only one of the upper fixing hook 183a and only one of the lower fixing hook 183b of the retainer 180 is engaged with the upper coupling hole 122a and the lower coupling hole 122b.

As described above, the retainers 180 may be configured such that the upper fixing hook 183a and the lower fixing hook 183b are formed to be symmetrical to each other along the centerline "C" of the main plate 181, thereby coupling the retainers 180 to the current collecting portions 120 and 130, irrespective of the slanted directions of the first and second electrode connectors 122 and 132. For example, even when the first electrode connector 122 is formed to be slanted toward the left side and the second electrode connector 132 is formed to be slanted toward the right side, the retainers 180 can be coupled to both of the first current collecting portion 120 and the second current collecting portion 130.

While the secondary battery according to the present invention has been particularly shown and described with reference to an exemplary embodiment thereof, it will be understood by those of ordinary skill in the art that various changes in form and details may be made therein without departing from the spirit and scope of the present invention as set forth by the following claims.

What is claimed is:

1. A secondary battery comprising:
an electrode assembly comprising a first electrode uncoated portion and a second electrode uncoated portion spaced apart along a lengthwise direction;
a case receiving the electrode assembly;
a cap plate coupled to a top portion of the case and sealing the case;
a current collector comprising a terminal connector positioned between the electrode assembly and the cap plate, and an electrode connector bent from an end of the terminal connector, positioned between the electrode assembly and the case, and having at least one coupling hole formed therein;
an insulation plate positioned on the electrode assembly and coupled to the terminal connector; and
a retainer coupled to the electrode connector and comprising at least one fixing hook, a fixing hook of the at least one fixing hook engaged with a coupling hole of the at least one coupling hole,
wherein the first electrode uncoated portion is bent so as to face the lengthwise direction and is attached to a surface of the electrode connector that faces the lengthwise direction.

2. The secondary battery of claim 1, wherein the at least one fixing hook comprises:
a pair of upper fixing hooks at an upper portion of the retainer; and
a pair of lower fixing hooks at a lower portion of the retainer.

3. The secondary battery of claim 2, wherein the at least one coupling hole comprises:
an upper coupling hole engaged with one of the pair of upper fixing hooks; and
a lower coupling hole engaged with one of the pair of lower fixing hooks.

4. The secondary battery of claim 3, wherein the other one of the pair of upper fixing hooks and the other one of the pair of lower fixing hooks are spaced apart from the electrode connector in a width direction of the retainer.

5. The secondary battery of claim 1, wherein the retainer comprises:
a main plate coupled to the electrode connector; and
a support plate positioned at a lower portion of the main plate and being slanted to support a side surface of the electrode assembly.

6. The secondary battery of claim 5, wherein the fixing hook protrudes from the main plate.

7. The secondary battery of claim 1, wherein the electrode connector is coupled to the retainer so as to be offset to one side on a side surface of the electrode assembly.

8. The secondary battery of claim 1, wherein the retainer covers a side surface of the electrode assembly.

9. The secondary battery of claim 1, wherein the retainer has bilateral symmetry.

10. The secondary battery of claim 1, wherein the electrode connector comprises:
a first region extending downwardly from the end of the terminal connector; and
a second region extending downwardly from the first region and protruding toward the electrode assembly,
wherein the coupling hole is formed in the first region.

11. The secondary battery of claim 10, wherein a protrusion height of the fixing hook is not greater than a step difference between the first region and the second region.

12. A secondary battery comprising:
an electrode assembly;
a case receiving the electrode assembly;
a cap plate coupled to a top portion of the case and sealing the case;
a current collector comprising a terminal connector positioned between the electrode assembly and the cap plate, and an electrode connector bent from an end of the terminal connector, positioned between the electrode assembly and the case, and having a coupling hole formed therein;
an insulation plate positioned on the electrode assembly and coupled to the terminal connector; and
a retainer coupled to the electrode connector and comprising a fixing hook engaged with the coupling hole,
wherein the insulation plate comprises:
a center hole at a center of the insulation plate and located to correspond to a safety vent of the cap plate;

at least one inlet hole outside the center hole and located to correspond to an electrolyte injection hole of the cap plate; and at least one fixing hook outside the at least one inlet hole and upwardly protruding, wherein the terminal connector has a through hole receiving a fixing hook of the at least one fixing hook of the insulation plate therein so as to be engaged with the fixing hook of the insulation plate.

13. The secondary battery of claim 12, wherein the insulation plate has bilateral symmetry with respect to the center hole.

14. The secondary battery of claim 12, wherein the at least one inlet hole comprises a pair of inlet holes located at opposite sides of the center hole.

15. The secondary battery of claim 14, wherein the at least one fixing hook of the insulation plate comprises a pair of fixing hooks located at opposite sides of the pair of inlet holes.

\* \* \* \* \*